May 18, 1926.
A. ARATO
1,585,180
TRAILER
Filed May 20, 1925
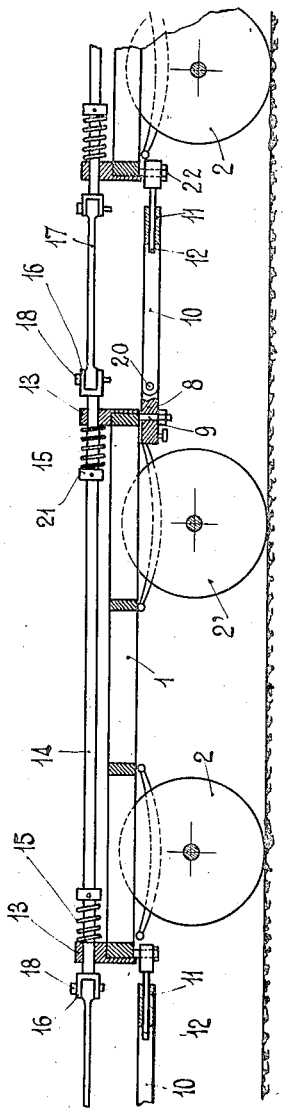
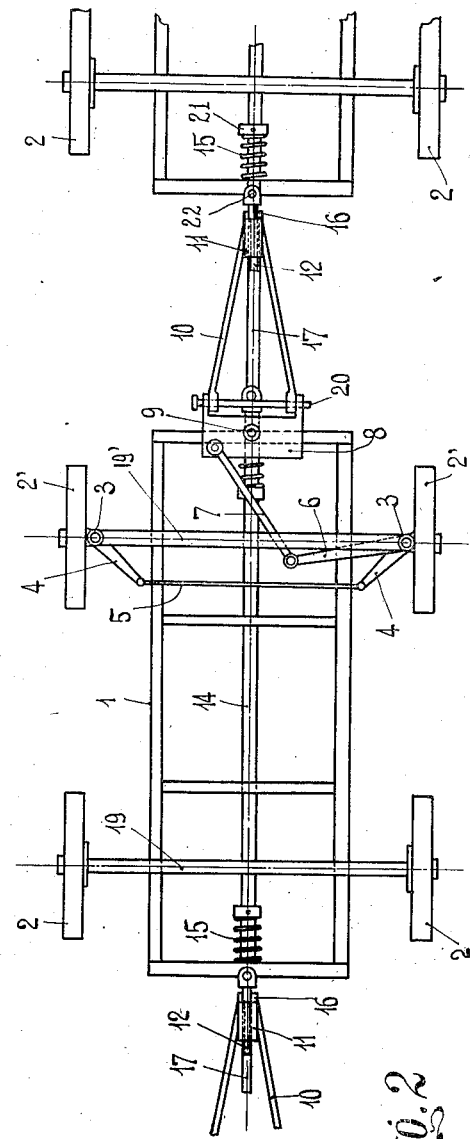
Inventor
A. Arato
by Langner, Parry, Card & Langner
Attys.

Patented May 18, 1926.

1,585,180

UNITED STATES PATENT OFFICE.

ACHILLE ARATO, OF TURIN, ITALY.

TRAILER.

Application filed May 20, 1925. Serial No. 31,628.

The present invention relates to vehicles for road trains and more particularly to draft and steering means for said vehicles, and has for its object a draft and steering gear comprising, means interconnecting said vehicles and transmitting the draft action to the trailer car and steering means cooperating with a member arranged at the back of the leading vehicle in such a manner that the steering means is not operative in the draft transmission and merely acts in controlling the steering gear of the trailed car.

On the annexed drawing is shown by way of example an embodiment of the present invention, and in said drawing:

Figure 1 is a vertical longitudinal section of vehicles of a road train equipped according to the present invention, and Figure 2 is a plan view of the same from bottom.

In said figures, 1 is the frame of each car and each car comprises four wheels 2—2' mounted on rear and front axles 19—19', the steering wheels 2' being supported by means of knuckles 3 solid with arms 4 interconnected by a link 5; one of said knuckles 3 has an arm 6 connected by a link 7 with a yoke 8 pivoting around a pivot bolt 9 and connected with a steering member consisting of two bars 10—10 pivoted on a bolt 20 of said yoke said yoke having an integral intermediate sleeve 11.

Each vehicle is connected with its leading vehicle by a member which is independent of the said steering member 10—10—11, and this steering member merely acts to impart to trailer wheels the steering motion of the leading vehicle, the interconnection of said steering member 10—10—11 with the leading vehicle being provided by said sleeve 11 embracing a stem 12 pivoted on the back of the leading vehicle, and being loose thereon in longitudinal direction.

Along the longitudinal axis of the vehicle frame is arranged a rod 14 which is mounted to reciprocate in brackets 13 solid with the vehicle frame and is held in its intermediate position by springs 15 each enclosed between a bracket 13 and a collar 21 fastened on said rod; said rod has end coupling heads 16 protruding from the vehicle frame at its ends.

The adjacent heads 16 of the rods 14 of the leading and trailed vehicles are interconnected by means of a link 17 which is pivoted by pins 18 in the said coupling heads 16 of said rods; the several vehicles of the train are therefore interconnected by their rods 14 and coupling links 17, said links and rods cooperating with the vehicle frames to transmit to several car frames the drive action of the train driving vehicle through the intermediation of cooperating springs 15 and brackets 13.

The steering gear is on the contrary independent and separate with respect to the drive transmission gear above described, said steering gear comprising the stem 12 and the steering member 10—10—11 which may move respectively along the longitudinal axis of said stem or tail 12 to agree with the variations in distance between leading vehicle and trailer as may occur in running and permitted by the resiliency of springs 15; said steering member complies only with the duty of transmitting to the steering gear of the trailer the deviations of the leading vehicle back as required for steering the trailer and causing it to follow correctly the track of the leading vehicle.

What I claim as my invention and desire to secure by United States Letters Patent is:—

1. In a trailer vehicle train wherein the trailer vehicle has a steering gear controlled by the trailing vehicle, a draw bar longitudinally movable in the frame of each vehicle, means interconnecting the draw bars of the vehicles, a pole member articulated to the steering gear of the trailer, and engaging means for coupling said member with a point of the central longitudinal axis of the rear portion of the frame of the trailing vehicle, said means providing an articulation about a vertical axis and allowing longitudinal play.

2. In a trailer vehicle train wherein the trailer vehicle has a steering gear controlled by the trailing vehicle, a longitudinal draw bar in the frame of each vehicle, resilient extensible means connecting each draw bar with its frame, means interconnecting the draw bars of the vehicles, a pole member articulated to the steering gear of the trailer, and engaging means for coupling said member with a point of the central longitudinal axis of the rear portion of the frame of the trailing vehicle, said means providing an articulation about a vertical axis and allowing longitudinal play.

3. In a trailer vehicle train wherein the trailer vehicle has a steering gear controlled by the trailing vehicle, a longitudinal draw bar in the frame of each vehicle, resiliently extensible means connecting each draw bar with its frame, means interconnecting the draw bars on the vehicles, a pole member articulated to the steering gear of the trailer, and engaging means for coupling said member with a point of the central longitudinal axis of the rear portion of the frame of the trailing vehicle, said means comprising a swinging joint with a vertical axis connected with longitudinal play with the pole member.

4. In a trailer vehicle train wherein the trailer vehicle has a steering gear controlled by the trailing vehicle, a longitudinal draw bar in the frame of each vehicle, resiliently extensible means connecting each draw bar with its frame, means interconnecting the draw bars of the vehicles, a pole member articulated to the steering gear of the trailer, and engaging means for coupling said member with a point of the central longitudinal axis of the rear portion of the frame of the trailing vehicle, and means comprising a part pivoted about a vertical axis on the frame of the trailing vehicle and a tail connected with said part and engaged in a longitudinal seat of the pole member.

In testimony whereof I have signed my name to this specification.

ACHILLE ARATO.